(12) United States Patent
Nicholson et al.

(10) Patent No.: US 7,036,040 B2
(45) Date of Patent: Apr. 25, 2006

(54) RELIABILITY OF DISKLESS NETWORK-BOOTABLE COMPUTERS USING NON-VOLATILE MEMORY CACHE

(75) Inventors: Clark D. Nicholson, Seattle, WA (US); William J. Westerinen, Sammamish, WA (US); Cenk Ergan, Bellevue, WA (US); Michael R. Fortin, Redmond, WA (US); Mehmet Iyigun, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 592 days.

(21) Appl. No.: 10/304,367

(22) Filed: Nov. 26, 2002

(65) Prior Publication Data

US 2004/0153694 A1 Aug. 5, 2004

(51) Int. Cl.
*G06F 11/00* (2006.01)
(52) U.S. Cl. ................ 714/6; 714/4; 714/47; 709/223; 709/224
(58) Field of Classification Search ............... 714/4, 714/6, 47; 709/223, 224
See application file for complete search history.

(56) References Cited

U.S. PATENT DOCUMENTS

| | | | |
|---|---|---|---|
| 4,979,108 A * | 12/1990 | Crabbe, Jr. ............... | 718/106 |
| 5,307,497 A | 4/1994 | Feigenbaum et al. | |
| 5,720,029 A * | 2/1998 | Kern et al. ............... | 714/20 |
| 6,073,232 A | 6/2000 | Kroeker et al. | |
| 6,101,601 A | 8/2000 | Matthews et al. | |
| 6,209,088 B1 * | 3/2001 | Reneris ................... | 713/1 |
| 6,338,126 B1 * | 1/2002 | Ohran et al. ............. | 711/162 |
| 6,401,093 B1 * | 6/2002 | Anand et al. ............ | 707/10 |
| 6,539,456 B1 * | 3/2003 | Stewart .................. | 711/113 |
| 6,751,658 B1 * | 6/2004 | Haun et al. ............. | 709/222 |
| 2004/0003223 A1 * | 1/2004 | Fortin et al. ............ | 713/1 |
| 2004/0044776 A1 * | 3/2004 | Larkin ................... | 709/228 |

OTHER PUBLICATIONS

Fortin et al., U.S. Appl. No. 10/186,164, filed Jun. 27, 2002.

* cited by examiner

*Primary Examiner*—Robert Beausoliel
*Assistant Examiner*—Emerson Puente
(74) *Attorney, Agent, or Firm*—Woodcock Washburn LLP

(57) ABSTRACT

A method and apparatus is provided that provides a reliable diskless network-bootable computers using a local non-volatile memory (NVM) cache. The NVM cache is used by the computer when the network is temporarily unavailable or slow. The cache is later synchronized with a remote boot server having remote storage volumes when network conditions improve. It is determined if data is to be stored in the NVM cache or the remote storage volume. Data sent to the remote storage volume is transactionally written and the data is cached in the NVM cache if a network outage is occurring or a transaction complete message has not been received. The data stored in the NVM cache allows the user to continue operating during network outages and the computer can be cold-booted using the data in the NVM cache if the network is unavailable.

25 Claims, 9 Drawing Sheets

RELIABILITY OF DISKLESS NETWORK-BOOTABLE COMPUTERS USING NON-VOLATILE MEMORY CACHE

FIELD OF THE INVENTION

This invention relates generally to network bootable computers and, more particularly, relates to diskless network-bootable computers.

BACKGROUND OF THE INVENTION

Hard disks are an integral component of current personal computers (PCs). Current PC architectures rely on an extremely tight integration and physical co-location of the primary system hard disk with the other PC components in order to function properly. This underlying architectural requirement of PCs is a source of multitudinous problems, inefficiencies and limitations. For example, the architecture forces users to store and administer all important user "state" (documents, files, settings, certificates, and so on) locally on the hard drive in a user's desktop PC.

The architecture causes information technology (IT) organizations to incur large costs to support and manage the infrastructure of stand-alone PCs and networked PCs. Additionally, corporate IT organizations lose control of corporate assets stored on individual hard drives. For example, backup and restore programs for the desktop are ineffective and difficult to administer. Any problem that involves a non-booting hard drive requires either a service call and/or physical access to the PC. Corporate assets are frequently lost due to desktop storage that is not professionally managed. IT organizations also find it difficult to "police" non-approved uses of PCs because they cannot manage the user state directly.

The tight integration and physical co-location of the primary system hard disk with the other PC components results in a lost opportunity for pooling of storage from users in a corporation. Today's corporate users require an average of about 5 GB of disk space. The smallest hard drive available on a PC today is about 30 GB (which is expected to increase in the future to 40 GB, 60 GB, and 80GB with Moore's law). As a result, the amount of wasted space in today's average corporate PC exceeds 80% and is growing.

Storage management has advanced tremendously in the last 5 to 10 years. The ability to virtualize LUNs (logical disk units) and seamlessly manage storage "behind" these virtualized resources has driven significant cost savings into the administration of corporate storage. None of these advances can be leveraged for storage that is located on users' desktops.

This tight integration and reliance of PCs on the internal hard drive has other ramifications for the user's experience. Hard drives take time to spin up. This is a significant part of the time required to boot a PC or to resume from hibernation. Hard drives are one of the few components inside a PC that have moving parts. As a result, they are one of the least reliable components of a PC and they represent one of the largest contributors to heat and noise for the PC.

To solve these problems, the PC industry has attempted many times to remove the hard disk from corporate PCs. Many of these attempts of creating a disk-less "net" PC rely on technologies such as BOOT-P and PXE (Preboot Execution Environment) to boot and run from centralized storage. None of these attempts has been successful. One reason that these attempts have not been successful is that Ethernet and TCP/IP cannot guarantee the consistent and low latency 'block' access that the PC architecture and operating system demand in order to operate reliably. Another reason is that critical files such as the page file and the system registry files must be local to the PC to provide the user with a reliable experience. Additionally, most PC applications such as email, file sharing, and Web access require an operating network to run properly. A user's productivity is negatively impacted when the network is operating unreliably or at less than optimal levels. For example, typical outages on today's networks can last for periods of up to five to six seconds. Data can be lost if an operating system is performing page operations when an outage occurs.

BRIEF SUMMARY OF THE INVENTION

The invention provides a method and system for reliably operating a networked diskless computer operating system in a computer that has a non-volatile memory (NVM) cache in a network having a remote boot server having one or more remote storage volumes. During operation, data is received from an application or the computer operating system and a predictive cache control module determines if the data is to be stored in the NVM cache or the remote storage volume. The data is transactionally written to the remote storage volume if the data is to be stored in the remote storage volume. If a network outage is occurring or a transaction completion message has not been received, the data to be stored in the remote storage volume is cached in the NVM cache and transactionally written from the NVM cache to the remote storage volume when the network is running. Data is retransmitted to the remote storage volume if the transaction complete message has not been received.

A history of prior use by a user is maintained and data that is required by a user to continue operation during a network outage is stored in the NVM cache based upon the history of prior use. The data, including static configuration data and dynamic configuration data is stored in the NVM cache prior to powering down the computer or hibernating the computer. The data, the set of static configuration data and the set of dynamic configuration data includes desktop settings, keyboard settings, and the data files that were being used prior to powering down the computer or hibernating the computer. The computer is cold-booted from the NVM cache if the network is not available when the computer is turned on.

The remote boot server receives a boot request from the computer and boots the computer using static configuration data and dynamic configuration date stored in the remote storage volume. The server sends a completion message to the computer when the process of writing the data to the remote storage volume is completed. The remote boot server also has a cache of non-volatile memory that is sized to store static configuration data and dynamic configuration data that has an initialization time that is approximately equal to a spin-up time of a disk drive in the remote storage volume. When the network is booted or the computer is booted or resumes operation from hibernation, the static configuration data and dynamic configuration data in the remote boot server's non-volatile memory cache is initialized while the disk drive is spinning up and initializing remaining configuration data stored on the disk drive during the at least one of the boot of the computer system and the resumption of the computer system from hibernation.

The network stack of the invention has a predictive cache control module to determine what is stored in the NVM cache and the remote storage volume, a file system filter driver that handles errors such as the NVM cache being full, a file system for storing and retrieving files from a hard disk in the remote storage volume, a write cache filter driver that writes data to be sent to the remote storage volume to the NVM cache if a network outage is occurring, a block mode network storage driver such as iSCSI to transactionally send data in packets to a network protocol layer that encapsulates the data in packets for transmission across a network, and a network adapter driver that sends the packets over the network to the remote storage volume. A NVM cache driver is used to interface with the NVM cache in one embodiment.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
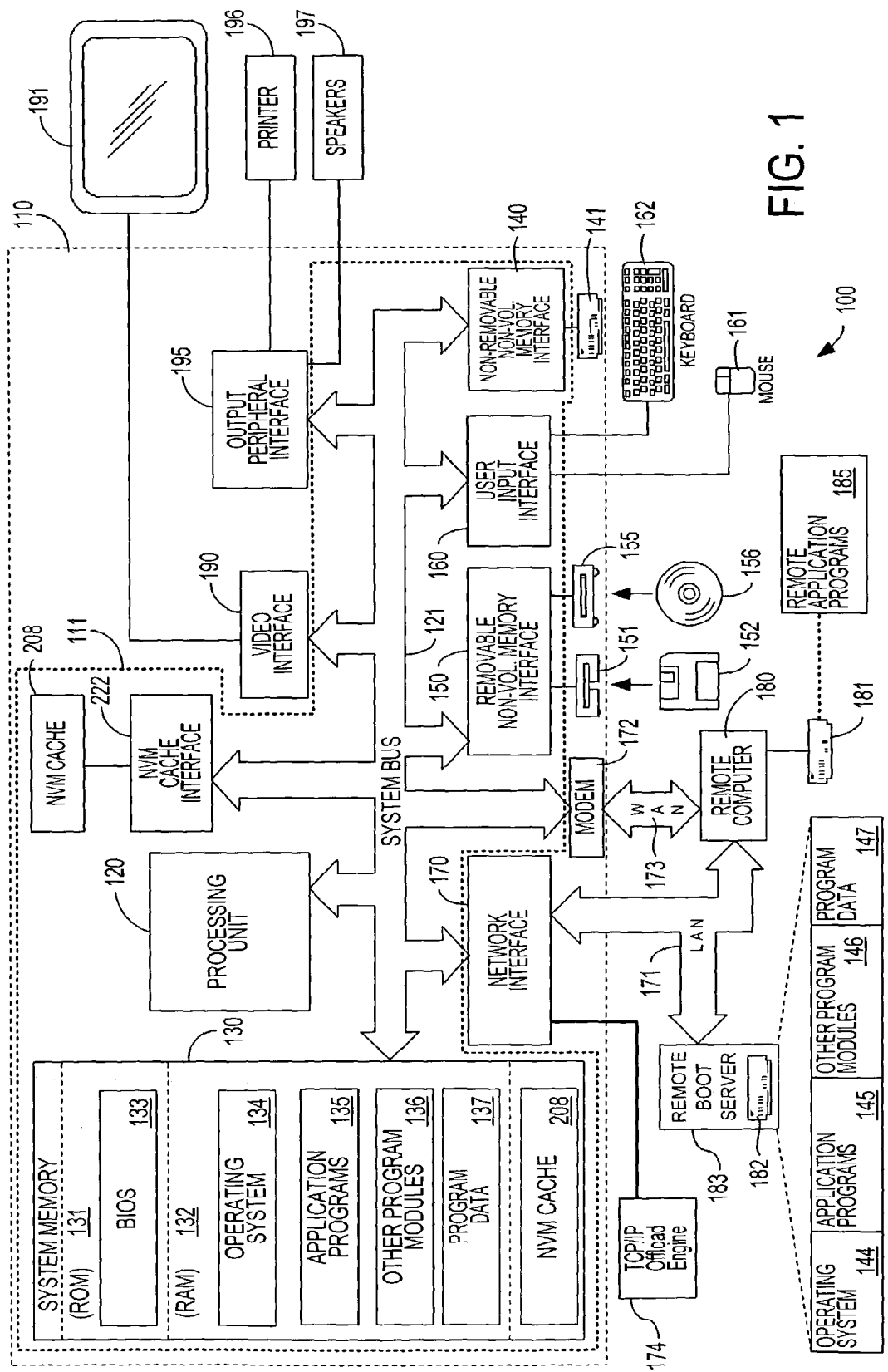
FIG. 1 is a block diagram generally illustrating an exemplary computer system on which the present invention resides.

The present invention provides a PC user with the ability to be insulated from network problems by creating a local storage cache that is used by the system when the network is temporarily unavailable or slow. The storage cache is later synchronized with a centralized storage when network conditions improve. A larger storage cache results in the user becoming more insulated from network problems. Non-volatile solid-state memory is used as the local storage cache.

NVM is still too expensive to completely replace the hard disk in PCs at this point, but when a relatively small quantity of NVM, such as approximately 256 MB, is added to a PC, the NVM can be configured as an "intelligent" write cache. This cache can provide the reliability and performance to make it feasible for system administrators to implement diskless PCs that boot from a centrally managed storage pool.

The diskless computers of the present invention boot from a central storage pool that results in several benefits. For example, the NVM write cache can significantly reduce the impact of poor network latency, which will enable the hard disk to be moved entirely off the desktop and into the data center. The NVM cache can keep the computer working during the vast majority of network outages. This makes computers significantly less expensive for corporations to deploy and operate. It will be possible to manage all the users' desktops in a corporation centrally in a data center environment, utilizing tools familiar to IT professionals. Storage management techniques that rely on widely deployed data center technologies, such as LUN (logical storage unit) virtualization, can be utilized to bring the benefits to managing all of the users' desktops, resulting in significant cost savings. For example, desktop volumes can be mirrored, backed up, restored, updated with hot-fixes and service packs, examined for viruses and cleaned, all from the data center, with minimal user down time.

Another benefit is that remote branch office desktops can be deployed and managed centrally. If a computer breaks, in most cases a brand new computer can be plugged in and be immediately functional, with no loss of data and with no onsite involvement by a professional IT service representative. Storage can be pooled and averaged across all of the users' desktops in a corporation. This will result in much better storage utilization, and avoid the need to over-provision storage, as is the case with user desktops today.

Computers that deploy this invention will provide higher performance when there is a DRAM cache miss or page fault and the data is in the NVM cache because the read and write latencies of NAND Flash are 10,000 to 100,000 times faster than disk. Additionally, faster cold boot times and hibernation resume times can be obtained.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. These components are located on a motherboard 111. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The magnetic disk drive 151 and optical disk drive 155 are typically connected to the system bus 121 by a removable memory interface, such as interface 150. NVM is still too expensive to completely replace the hard drive in the computer 110. As a result, the computer 110 may have a hard drive 141 that is typically connected to the system bus 121 through a non-removable memory interface such as interface 140. The hard drive could have an NVM cache.

The drives and their associated computer storage media discussed above and illustrated in FIG. 1, provide storage of computer readable instructions, data structures, program modules and other data for the computer 110. In FIG. 1, for example, remote storage volume 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. The remote storage volume 141 is typically located at a central location and may contain application programs, other program modules, and program data for multiple users. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 operates in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121. While shown directly connected to the system bus, it may be connected to the system bus via the user input interface 160, the network adapter 170 or other appropriate mechanism. A TCP/IP offload engine 174 may be connected to network adapter 170. The TCP/IP offload engine 174 is used to offload TCP/IP tasks that typically require a significant amount of resources from the processing unit 120 to perform. The network adapter 170 and TCP/IP stack will typically be part of a network adapter card for iSCSI implementations. The remote storage volume 182, which is typically a non-removable, nonvolatile magnetic media, is located in remote boot server 183 The remote storage volume 182 is typically connected to the system bus 121 through an interface such as network adapter 170. Program modules depicted relative to the personal computer 110, or portions thereof, may be stored in the remote storage volume 182. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
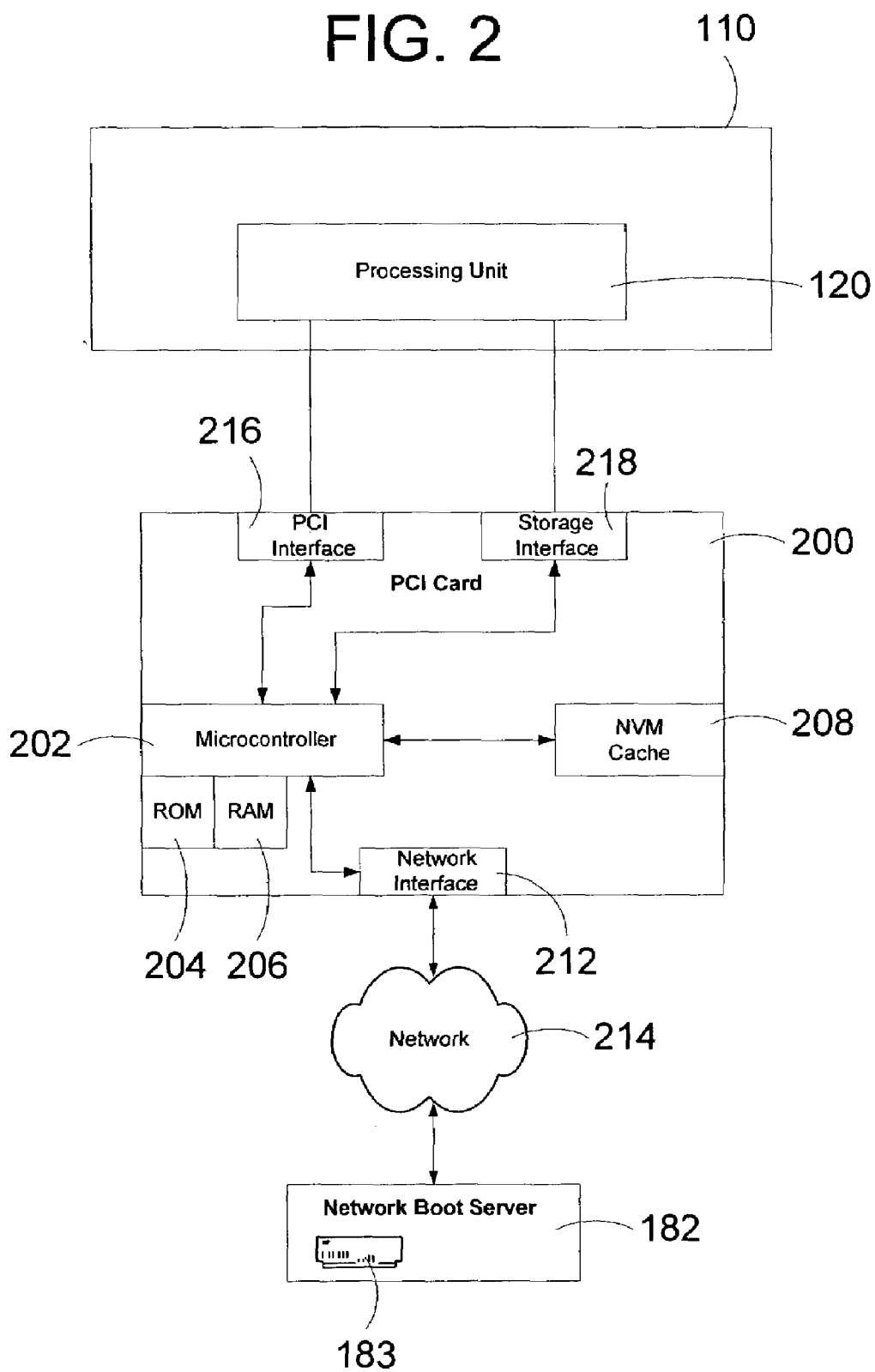
FIG. 2 is a block diagram illustrating an embodiment of the invention using a hardware card.

The present invention may be implemented in a variety of ways. FIG. 2 illustrates an embodiment where the NVM cache is in the network adapter card hardware. This embodiment can be implemented on a current computer by installing a hardware card 200 and associated driver on the computer 110. An iSCSI (Internet Small Computer System Interface) based hardware card 200 is used. The card 200 plugs into the PCI (Peripheral Component Interconnection) bus or equivalent type of bus and it appears to the operating system 134 as a SCSI drive attached to the system 100. The hardware card 200 has a processor 202 that is operating with a SCSI protocol stack, IPSEC, and may support TCP offload. The processor 202 has ROM 204 and RAM 206 and caches data autonomously or as instructed by the operating system 134 in NVM 208. ROM 204 is optional and it allows the BIOS setup to provide a means to configure the card to connect to a specific network boot server address. The processor implements a storage block level network protocol stack to communicate with the network boot server 183, which contains remote storage volume 182, via network interface 212 and network 214. Network interface 212 may be an Ethernet adapter. The processing unit 120 communicates with processor 202 through IOCTLs (system-dependent device input/output control commands) through interface 216, 218 or other type of interface to provide the processing unit 120 with a way to inform the processor 202 which data blocks to cache in NVM cache 208 and which blocks to store in remote storage volume 182. Interface 218 is optional and could be removed if the optional ROM 204 provides a means for the BIOS to boot from card 200.

Figure 3:
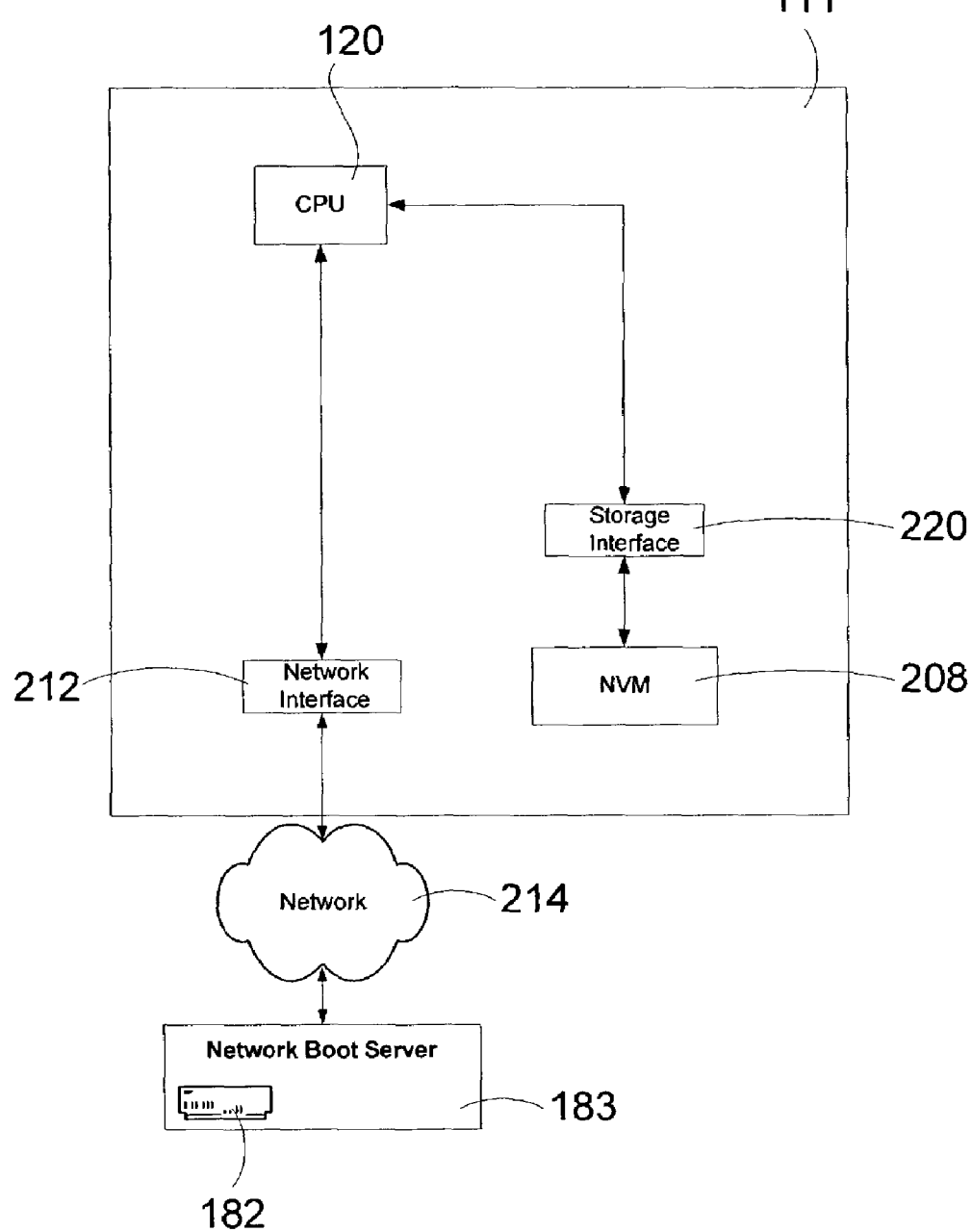
FIG. 3 is a block diagram illustrating an alternate embodiment of the invention implemented in a motherboard.

Turning now to FIG. 3., an alternate embodiment is shown. The NVM cache 208 is located on the computer motherboard 111. This embodiment provides better performance and reliability due to a more advanced predictive algorithm that can be implemented in the operating system 134. In this embodiment, the processing unit 120 communicates with remote storage volume 182 using IOCTLs and DMA transfers or the equivalent through interface 212 to store data blocks in remote storage volume 182 or cache data blocks in NVM cache 208. The NVM cache 208 may be exposed to the processing unit 120 as a disk or as a native device type. If exposed as a native device type, the processing unit 120 enumerates it and uses it as a resource. If exposed as a disk, the processing unit 120 caches data blocks in NVM cache 208 via interface 220. Interface 220 may be an IDE/ATA protocol, a SCSI protocol, an iSCSI protocol, an NVM cache driver and the like. Those skilled in the art will recognize that embodiments other than those shown in FIGS. 2 and 3 may be used. Returning to FIG. 1, the NVM cache 208 may be part of system memory 130 or separate from system memory 130 if implemented as a native device type. The NVM cache 208 is accessed by cache interface 222. On writes, the storage driver stack (described herein below) uses the NVM cache 208 to immediately cache data locally and then synchronize with the remote storage volume 182 at a later appropriate time. On reads, the storage driver stack returns data from the NVM cache 208 if it is available and only loads from the remote storage volume 182 if blocks are not available in the NVM cache 208.

The size of the NVM cache 208 is determined based on the amount of data to be stored and the reliability of the network. It has been shown that 64 MB of NVM memory using Microsoft Office as an application is sufficient to hold an hours worth of data offline. The size is a tradeoff between being less susceptible to network outages versus the cost of the computer with the added NVM. 256 MB of Flash NVM is used in one embodiment and is projected to cost as low as $40 in 2004 dollars. This allows enough data to be stored in the NVM cache 208 for a user to resume from hibernate or cold boot from the NVM cache and start working on a document stored in the NVM cache 208 until the network 214 is up and running.

Figure 4:
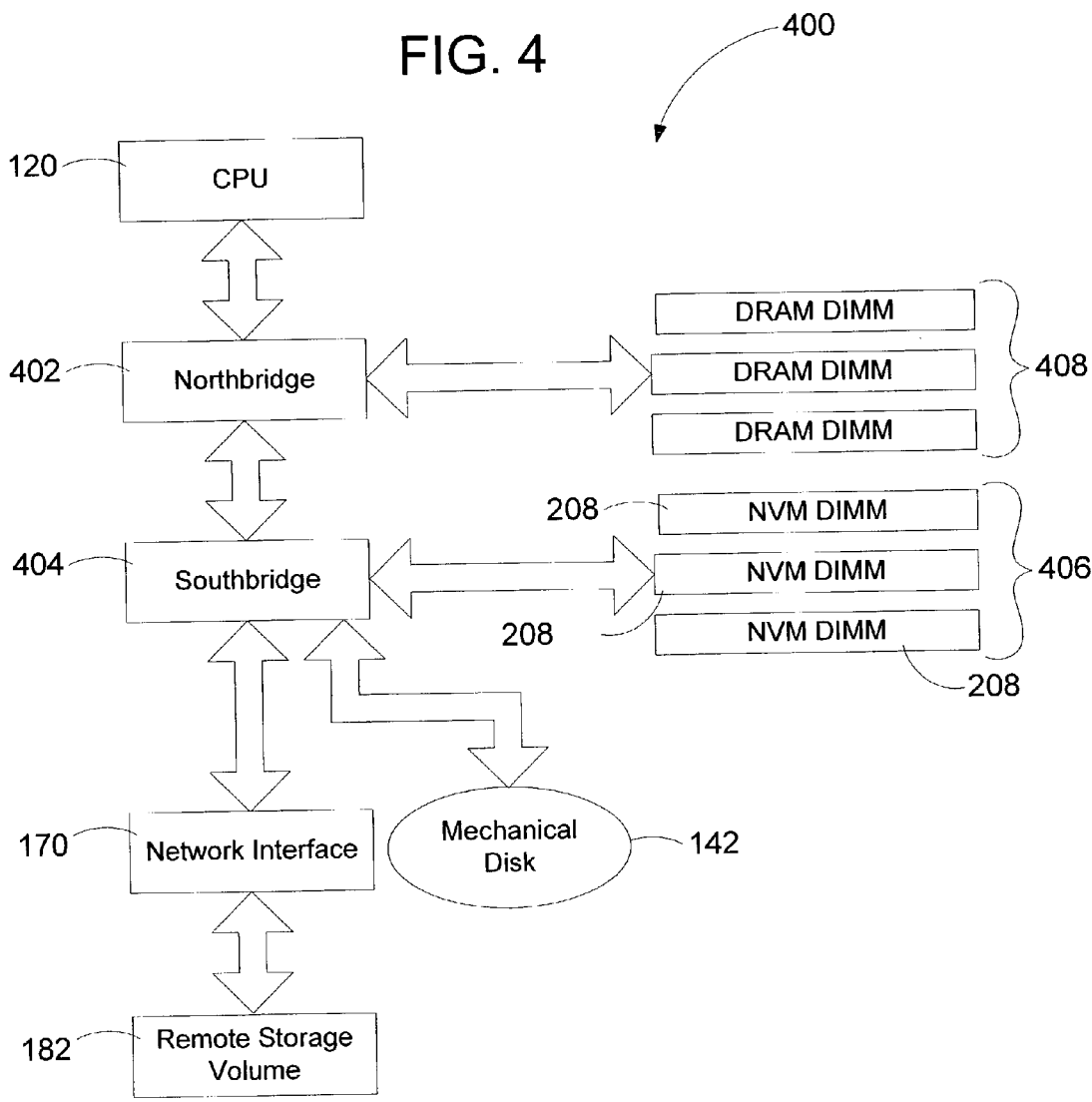
FIG. 4 is a block diagram illustrating the NVM cache of the present invention implemented in the Northbridge/Southbridge architecture.
Figure 5:
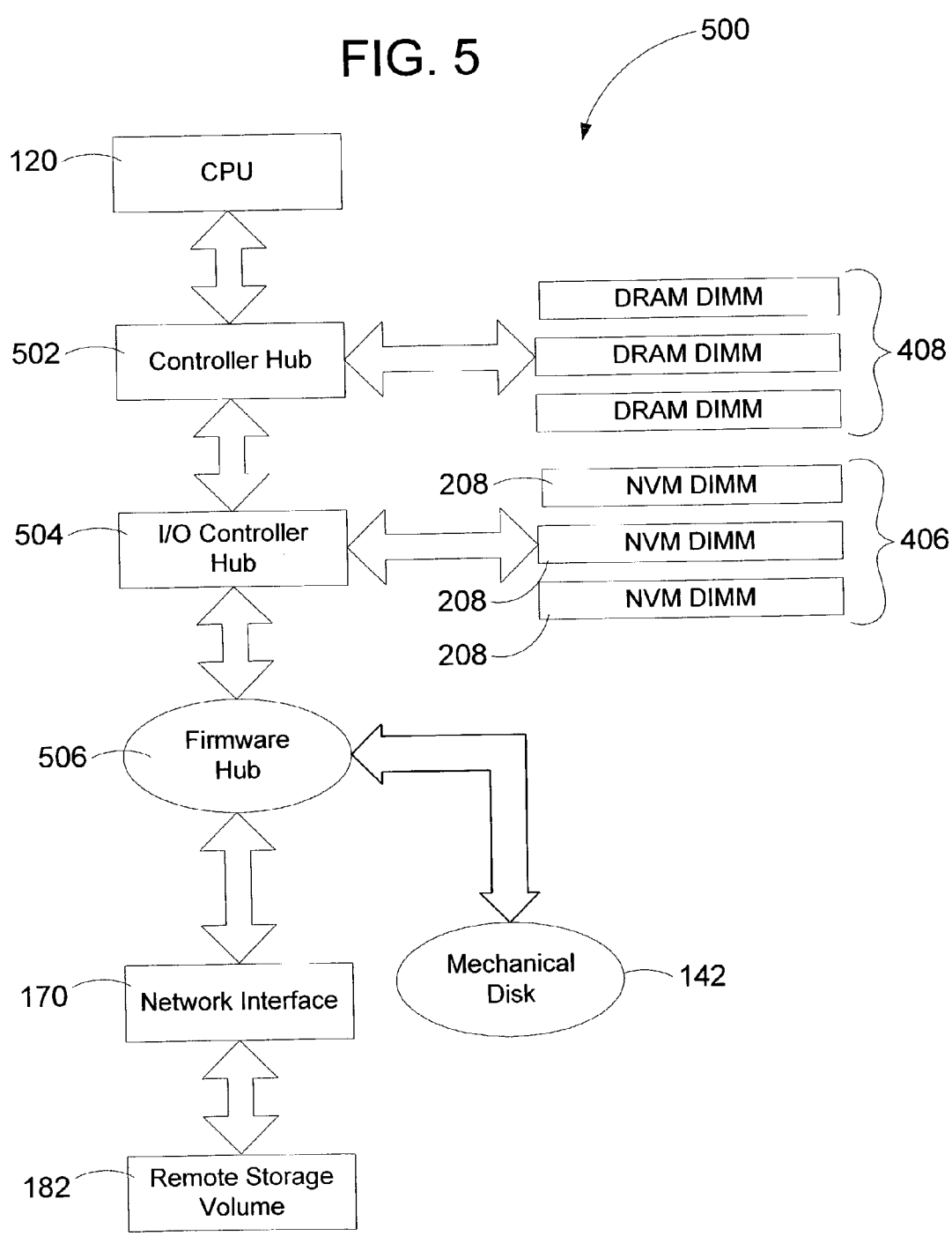
FIG. 5 is a block diagram illustrating the NVM cache of the present invention implemented in an accelerated hub architecture.

FIGS. 4 and 5 illustrate how the NVM cache 208 is incorporated into existing chipsets. FIG. 4 illustrates the NVM cache 208 in the Northbridge/Southbridge architecture 400. Northbridge 402 controls the processor 120, memory 130, Peripheral Component Interconnect (PCI) bus, Level 2 cache, and all Accelerated Graphics Port (AGP) activities. Southbridge 404 manages the basic forms of input/output (I/O) such as Universal Serial Bus (USB), serial, audio, Integrated Drive Electronics (IDE), and Industry Standard Architecture (ISA) I/O in computer 110. The Southbridge implements an interface to NVM DIMM slots 406 similar to how the Northbridge interfaces to DRAM DIMMs 408. This allows the user to add NVM to ride out longer interruptions in network access and allows the end user to add additional NVM 208 as they add DRAM 408 to allow a hiberfile to be stored in NVM 208 for improved hibernation resume times. NAND Flash and other existing NVM technologies may have problems that can be compensated for in the Southbridge interface 404. Access times may be slow and the NVM technology may exhibit wear out phenomenon that causes cells to no longer be useful after approximately $10^5$ erase/write cycles. The wear-out characteristics of NVM are well understood and standard wear leveling technology can be deployed by the Southbridge interface 404 to average out the erases and writes.

The Accelerated Hub Architecture 500 illustrated in FIG. 5 uses a dedicated bus to transfer data between the controller hub 502 and the I/O controller hub 504 instead of using the Peripheral Component Interconnect (PCI) bus as used in the Northbridge/Southbridge architecture. The memory controller hub 502 provides the central processing unit (CPU) interface, the memory interface, and the accelerated graphics port (AGP) interface. The memory controller hub supports single or dual processors with up to 1 GB of memory. The memory controller hub also allows for simultaneous processing, which enables more life-like audio and video capabilities. The I/O controller hub 504 provides a direct connection from the memory to the I/O devices, which includes any built-in modem and audio controllers, hard drives, Universal Serial Bus (USB) ports, and PCI add-in cards. The I/O controller hub 504 implements an interface to NVM DIMM slots 406 similar to how the controller hub 502 interfaces to DRAM DIMMs 408.

Figure 6:
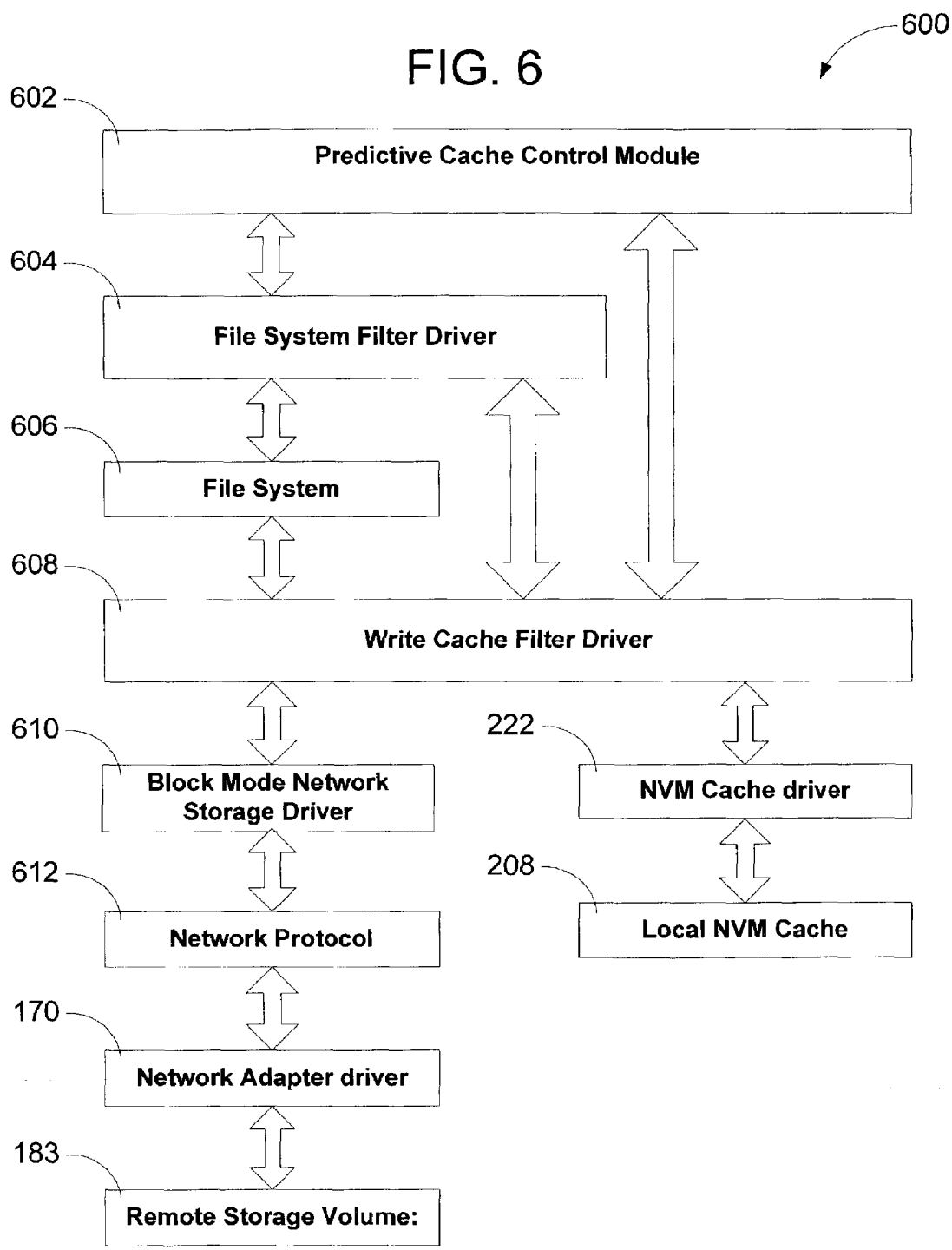
FIG. 6 is a block diagram illustrating a network stack in accordance with the present invention.

Turning now to FIG. 6, the storage driver stack 600 is shown for the implementation described in FIG. 3. The operating system 134, application programs 135, other program modules 136 send data (e.g., documents, spreadsheets, files, graphics and the like) to the storage driver stack 600. The predictive cache control module 602 controls what is in the volatile memory 132 and non-volatile memory 182, 208. The file system filter driver 604 receives data from the predictive cache control module 602. The principal function of file system filter driver 604 is to gracefully handle errors such as when the NVM cache 208 is full. The file system filter driver 604 passes the data through the file system (i.e., NTFS) 606, which the operating system 134 uses for storing and retrieving files from a hard disk in the remote storage volume 182.

The write cache filter driver 608 receives data from the file system 606 and the predictive cache control module 602. The write cache filter driver 608 sends data to be cached in the local NVM cache 208 to the NVM cache driver 222. NVM cache driver 222 detects when the NVM cache 208 no longer has capacity (i.e., it is full) and sends a message to file system filter driver 604 to indicate the NVM cache 208 is full. In response, the file system filter driver 604 informs the predictive cache control module 602 to stop sending data to the NVM cache 208 until the NVM cache 208 has storage capacity.

The write cache filter driver 608 synchronizes the local NVM cache 208 and remote storage volume 182. If data is stored in the NVM cache 208 and the remote storage volume 182, the write cache filter driver 608 reads from the NVM cache 208 when it needs to synchronize the local write cache in NVM cache 208 with the remote storage volume 182. During network outages, the write cache filter driver 608 writes data to be routed to the remote storage volume 182 to the NVM cache 208 until the network is reliably running again. As used herein, a network outage is defined as when a network is down due to a power outage or other failure or the data transmission rate is below a threshold. The threshold is selected based on a typical data transmission rates during normal operating conditions and during periods of network congestion. When the network is reliably running again, data stored in NVM cache 208 to be routed to the remote storage volume 182 is transactionally written to the remote storage volume 183 in the background. This allows the system 100 to seamlessly continue working for the periods of time the network is not operating reliably. When a write is completed, the remote storage volume 183 sends a transaction completion message. Transaction writing allows a write to the remote storage volume 183 to be retried if the write fails or gets interrupted (i.e., no completion message is received). If the system reboots due to a loss of power or any other reason during a network outage, the write cache filter driver 608 synchronizes the remote storage volume 182k with the data stored in the NVM cache 208 after the system is running again and the network is available.

The block mode network storage driver 610 receives data to be sent to the remote storage volume 183. The block mode network storage driver 610 sends data in blocks to the remote storage volume 183. It may be iSCSI or equivalent. iSCSI enables block storage transfer. It is a protocol that encapsulates SCSI commands in TCP/IP enabling high performance storage area networks (SANs) over standard networking technology. The block mode network storage driver 610 is converts the data into data blocks (SCSI-3 data if iSCSI is used) and sends the data blocks to the network protocol layer 612 (e.g., TCP/IP) where the data blocks are enclosed in network protocol packet (e.g., IP packets) and sent to the remote storage volume 183 via network adapter driver 140 (e.g., NDIS).

As previously indicated, the predictive cache control module 602 determines what is stored in the NVM cache 602. In general, the predictive cache control module 602 looks at a user's behavior over an extended period of time and determines what programs and data the user is accessing frequently and stores the data, which includes static and dynamic configuration data in the NVM cache 208. Data as used herein includes personal data files such as scheduled tasks, financial information, data files, and the like. The module 602 starts with defaults until the behavior of a user can be predicted. The static and dynamic configuration data is based on a history of prior use and comprises data that is required by the user to continue operation during network outages. The static configuration data is data that does not change periodically. The dynamic configuration data is data that changes periodically and is on a per-user basis. The configuration data may include keyboard devices, pointing devices, the USB subsystem, the video subsystem, output peripheral drivers (e.g., printer driver) the operating system, application programs, and the like.

The static configuration data is system configuration data that is used for all users. For example, in the Windows™ operating system, the static configuration data includes boot strapping code to load the static and dynamic configuration data stored on the NVM cache 208. Other static configuration data in the Windows™ operating system includes files necessary to initialize the kernel such as registry initialization (smss.exe), video initialization (csrss.exe), the shell, services that run from dynamic link libraries (svchost.exe), security services (lsass.exe) such as IPSec and network login. For a computer system that is powering down, the static configuration data that is stored in the NVM cache 208 includes the boot strapping code, kernel initialization files, the video initialization files, the shell, services (e.g., dynamic link libraries) that are needed to operate the computer 110, application programs, and the like. The dynamic configuration data is system configuration data that is on a per-user basis. For example, dynamic configuration data includes desktop settings (e.g., background image, icon location, etc.), security credentials, internet favorite files, fonts, start-up programs, keyboard settings, and the like.

Figure 7:
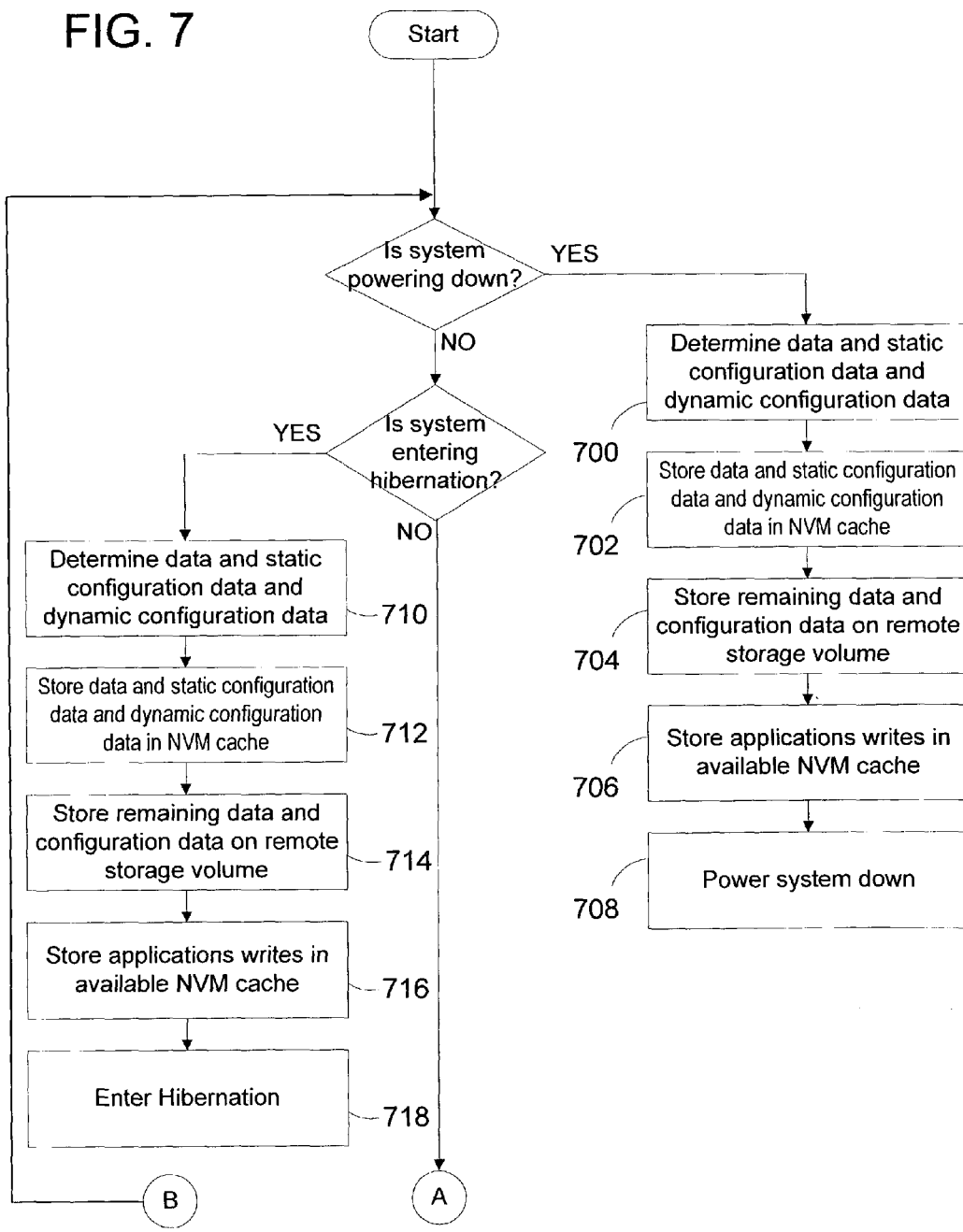
FIG. 7 is a flow chart illustrating a first portion of a process for storing static and dynamic configuration data during power-down or entering into a hibernate mode in order to ride out network outages and power outages without loss of data in accordance with the teachings of the present invention.
Figure 8:
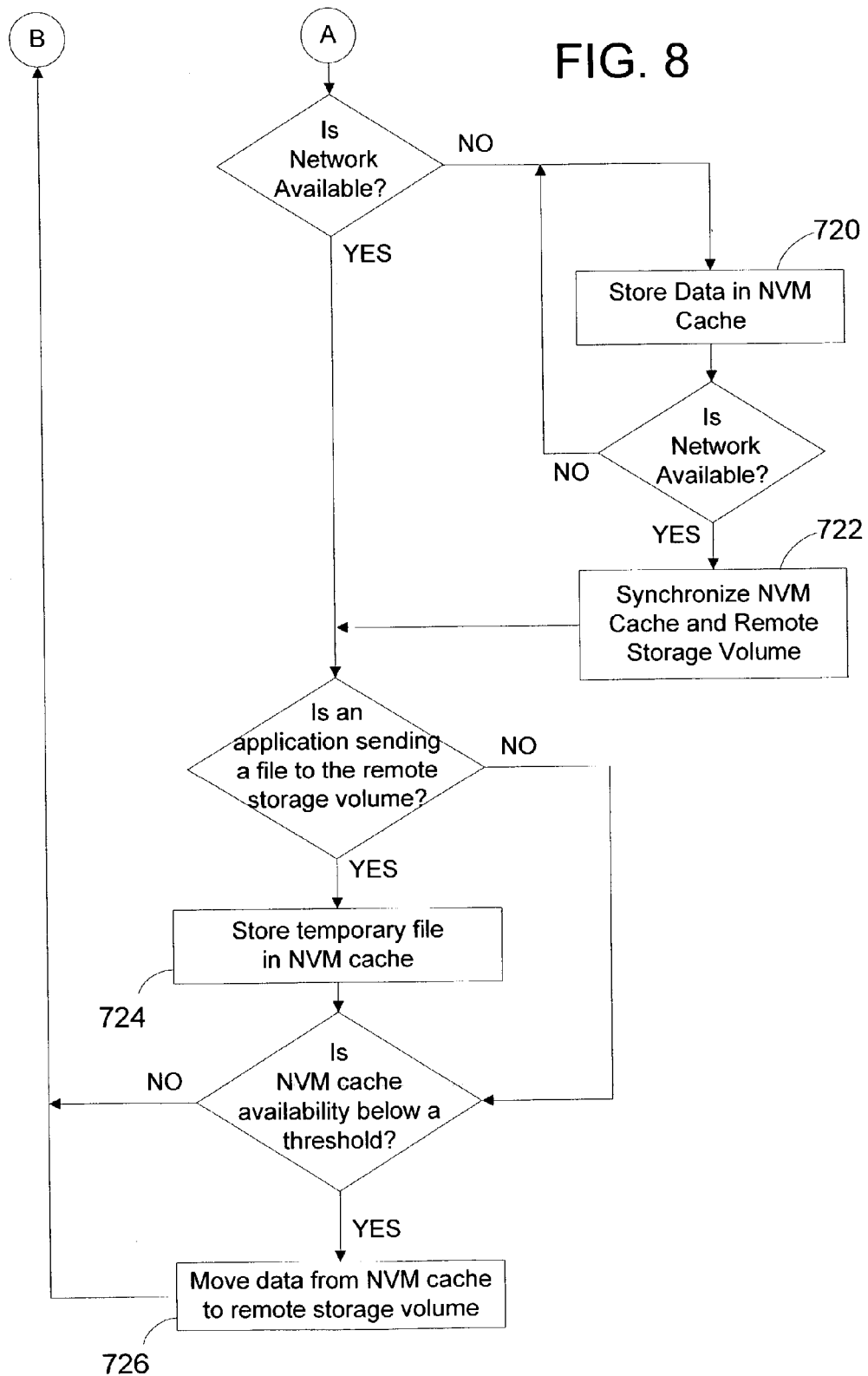
FIG. 8 is a flow chart illustrating a remaining portion of the process for storing static and dynamic configuration data.

Operation of the present invention will now be described with reference to FIGS. 7 and 8. For a computer system that is powering down, the data and static and dynamic configuration data to be stored on the NVM cache 208 is determined (step 700). The data and configuration data is based upon the history of the user. The data includes the most recently used data files. The dynamic configuration data that is stored in NVM cache 208 includes the desktop settings, keyboard settings, and security credentials. The data and the static and dynamic configuration data are stored on the NVM cache 208 (step 702). Data that has not been recently used and static and dynamic configuration data that is not needed for operation is sent to the remote storage volume 182 for storage (step 704). Data that is being sent to the remote storage volume 182 for storage that the operating system can not control such as an application writing to the remote storage volume 182 is sent to the NVM cache 208 for storage if the network is not available or the transaction completion message is not received (step 706). This reduces the number of writes to the remote storage volume 182, which results in a faster power down time. The computer system is then powered down (step 708).

If the system is going into hibernation, similar steps occur. Data and static configuration data and dynamic configuration data to be stored in the NVM cache 208 is determined (step 710) and stored in memory (step 712). This data includes the data that is necessary to "repaint" (i.e., restore) the graphical user interface quickly. The static configuration data includes kernel files, the video files, the shell and services that run from dynamic link libraries that were in use prior to hibernation. The dynamic configuration data includes desktop settings, keyboard settings, fonts that were being used prior to hibernation. The data includes the data files in use by the user prior to hibernation. Data that has not been recently used and static and dynamic configuration data that is not needed for operation is sent to the remote storage volume 182 for storage (step 714). Data that is being sent to the remote storage volume 182 for storage that the operating system can not control such as an application writing to the remote storage volume 182 is sent to the NVM cache 208 for storage if the network is not available or the transaction completion message is not received (step 716). This reduces the number of writes to the remote storage volume 182, which results in a faster power down time. The computer system then enters hibernation (step 718).

If the network is unavailable, data to be sent to the remote storage volume 182 is stored in the NVM cache 208 until the network is available (step 720). After the network becomes available, the data in the NVM cache 208 and the remote storage volume 182 is synchronized (step 722). In one embodiment, the NVM cache 208 is used during system operation. If an application or the operating system is sending data to the remote storage volume 182, the data is stored in the NVM cache 208 before being sent to the remote storage volume 182 (step 724). This provides the benefit of preserving data if power is lost. When the system is being powered down or entering hibernation, the data stored in the NVM cache 208 to be sent to the remote storage volume 182 is transactionally written to the remote storage volume 182. If the available space of the NVM cache 208 falls below a threshold, the data in the NVM cache that has not been recently used is transferred to the remote storage volume 182 (step 726). Storing the data in the NVM cache 208 decreases the number of times the remote storage volume 182 is accessed during operation. This reduces the amount of traffic over the network 214.

Figure 9:
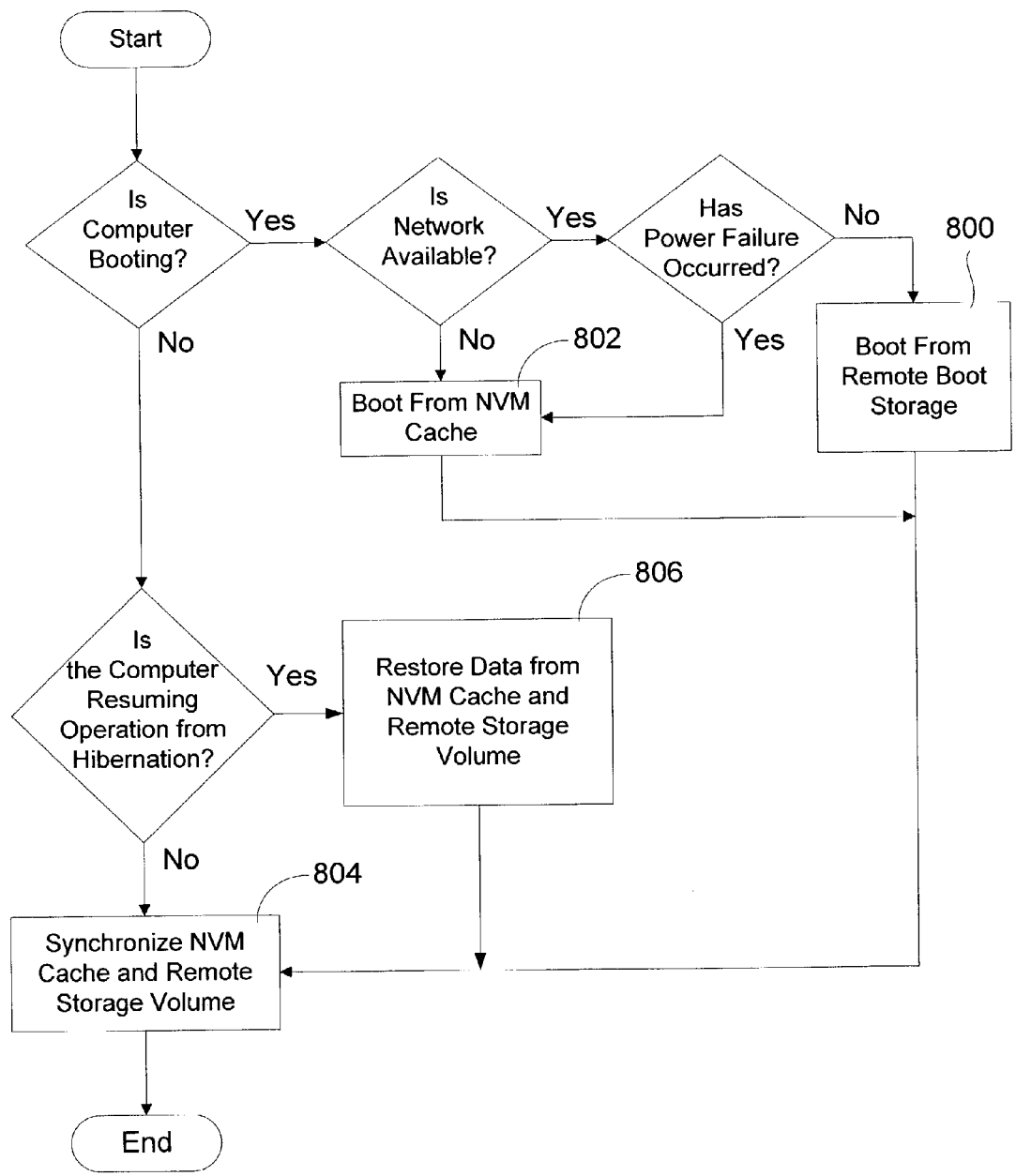
FIG. 9 is a flow chart illustrating a process for operation after a network outage, a computer boot, and resuming operation after a hibernation.

Turning now to FIG. 9, the steps taken to boot the computer system and restore the computer system from hibernation are shown. The computer system normally boots from the remote storage volume 182 (step 800). If the network 214 is not available, the computer system boots using the static configuration data and dynamic configuration data stored in the NVM cache 208 (step 802). Once the network is available, any data needed from the remote storage volume 182 is acquired. This data will typically be data that the predictive cache control module 602 has sent to the remote storage volume 182 based on the user not having accessed the data recently. The experience the user sees is that when the user hits the power button, she should see a responsive interactive logon screen by the time of or shortly after the time that the monitor 191 or other type of display device turns on instead of having to wait for the remote storage volume to be accessed. In one embodiment, if the reason the computer is being booted is due to a power failure, the computer is booted from the NVM cache 208. This provides the benefit that after power is restored, a network "storm" is avoided where PCs on the network attempt to network boot simultaneously.

After the user is up and running, the data in the NVM cache 208 may be verified to be consistent with the data on the remote storage volume 182 (step 804). If the data is not consistent, either the data in the NVM cache 208 is updated if the data in the remote volume storage is more up to date or the data in the NVM cache 208 is replicated in the remote storage volume 182 if the data in the NVM cache 208 is more up to date. A help button or switch can be used to bypass the NVM cache 208 and turn on the computer system in safe mode for recovery and backward compatibility purposes (i.e., boot from the remote storage volume 182). If the system reboots due to a loss of power or any other reason during a network outage, the write cache filter driver 608 synchronizes the remote storage volume 182 with the data stored in the NVM cache 208 after the system is running again and the network is available. If the computer wakes from the hibernate mode, the computer system resumes operation using the static configuration data and dynamic configuration data stored in the NVM cache 208 and from the remote storage volume if needed (step 806). The data in the NVM cache 208 is synchronized with the data in the remote storage volume 182 after the computer system resumes operation (step 804).

In an alternate embodiment, the computer 110 boots from the NVM cache 208 and the boot code checks to see if the files on the remote storage volume 182 are more recent by checking the modification dates on the files. If the files on the remote storage volume 182 are not more recent, the computer 110 continues to boot from the NVM cache 208. If the files on the remote storage volume 182 are more recent, the boot code loads the more recent files from the remote boot server 183. This provides the benefit that after power is restored to the network 214, a network "storm" is avoided where thousands of PCs attempt to network boot simultaneously.

In one embodiment, the network boot server has an NVM cache. The static configuration data and dynamic configuration data stored in the network boot server's NVM cache is selected so that the time of initializing the static configuration data and dynamic configuration data is approximately equal to the spin-up time of the disk drive(s) in the remote storage volume 183. The static and dynamic configuration data is configuration data that does not need data from the disk drive to be initialized. It may include keyboard devices, pointing devices, the USB subsystem, the video subsystem, and the like. The size of the flash memory required is equal to the size of the static configuration data and dynamic configuration data. In many operating systems, the size of the flash memory needed ranges from 16 MB to 64 MB.

It can be seen that a diskless network bootable PC using non-volatile memory cache such as flash memory has been described. Flash memory is solid-state and has no moving parts. Users' hard drives can be easily protected with redundant disk technology such as RAID with significantly less cost than if they were on the desktop. The cost to manufacture systems built with no hard disk will decrease more over time than systems with mechanical disk drives. Hard disk drives have a well-known cost floor due to mechanical parts and packaging. In contrast, the solid state components that make up the intelligent storage cache all will scale forward in time with Moore's Law. For example, NAND Flash has a smaller cell size than DRAM, and is already significantly cheaper to manufacture than DRAM. Projections from the industry on NAND Flash predict that it will continue to outdistance DRAM in cost. There are several candidates for NVM currently in development that will bring even more cost and performance benefit than NAND Flash. For example, exotic NVM technologies such as PFRAM (polymer ferroelectric RAM—"plastic memory") or MEMS (micro electromechanical systems) may be available in the future. As this technology is embedded as a critical part of the PC architecture, the PC will benefit from these improvements. The converse is also true: if the PC remains without NVM technologies, other competitive devices that rely on NVM will become more competitive over time with respect to the PC.

If this invention is coupled with changes to the operating system that separate machine, application and user state from the common operating system files, system administrators will see even further benefits by eliminating the need to manage an operating system image for each PC. They could instead manage a single operating system for all PCs, and then simply manage the much smaller state information on a per-machine and per-user basis.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for reliably operating a computer operating system in a computer having a non-volatile memory (NVM) cache connected to a network having a remote storage volume comprising the steps of:
   receiving data from one of an application and the computer operating system;
   determining if the data is to be stored in either of the NVM cache or the remote storage volume;
   writing the data to be stored in the NVM cache to the NVM cache;
   transactionally writing the data to the remote storage volume if the data is to be stored in the remote storage volume;
   caching the data to be stored in the remote storage volume in the NVM cache if one of a network outage is occurring and a transaction complete message has not been received;
   transactionally writing the data cached in the NVM cache to be stored in the remote storage volume to the remote storage volume when the network is running; and
   determining the data, static configuration data and dynamic configuration data that is to be stored in the NYM cache prior to at least one of powering down the computer operating system and hibernating the computer operating system.

2. The method of claim 1 further comprising the step of storing data that is required by a user to continue operation during a network outage in the NVM cache.

3. The method of claim 2 further comprising the step of maintaining a history of prior use by the user.

4. The method of claim 1 wherein the step of determining the data, static configuration data and the dynamic configuration data includes the steps of:
   determining the data, a set of static configuration data and a set of dynamic configuration data that allows a user to continue working if a network outage occurs.

5. The method of claim 4 wherein the step of determining the data, the set of static configuration data and the set of dynamic configuration data includes at least one of determining desktop settings, determining keyboard settings, and determining the data files that were being used prior to the at least one of powering down the computer operating system and hibernating the computer operating system.

6. The method of claim 4 further comprising the step of booting from the NVM cache if the network is not available when the computer is turned on.

7. The method of claim 6 further comprising the step of synchronizing the data in the NVM cache and the remote storage volume after the network becomes available.

8. The method of claim 4 further comprising the step of booting from the NVM cache.

9. The method of claim 8 further comprising the step of checking the modification dates of data on the NYM cache and the remote storage volume and loading data from the remote storage volume that is more recent than the data in the NVM cache.

10. The method of claim 4 further comprising the step of resuming operation from hibernation using the NVM cache if the network is not available.

11. The method of claim 10 further comprising the step of updating one of the data, static configuration data and dynamic configuration data stored in the NVM cache and data, static configuration data and dynamic configuration data stored in the remote storage volume if the data, static configuration data and dynamic configuration data stored in the NVM cache and data, static configuration data and dynamic configuration data stored in the remote storage volume are not consistent.

12. The method of claim 1 further comprising the step of writing data sent from the application during power down to be sent to the remote storage volume in the NVM cache.

13. The method of claim 1 further comprising the step of retransmitting data to the remote storage volume if the transaction complete message has not been received.

14. A method for reliably operating a computer operating system in a computer having a non-volatile memory (NVM) cache connected to a network having a remote storage volume comprising the steps of:
receiving data from one of an application and the computer operating system;
determining if the data is to be stored in either of the NVM cache and the remote storage volume;
writing the data to be stored in the NVM cache to the NVM cache;
transactionally writing the data to the remote storage volume if the data is to be stored in the remote storage volume;
caching the data to be stored in the remote storage volume in the NVM cache if one of a network outage is occurring and a transaction complete message has not been received; and
transactionally writing the data cached in the NVM cache to be stored in the remote storage volume to the remote storage volume when the network is running; and
determining if the data, static configuration data and dynamic configuration data stored in the NVM cache are consistent with data, static configuration data and dynamic configuration data stored on the remote storage volume.

15. A computer readable storage medium having a tangible component and computer executable instructions for performing the steps of reliably operating a computer operating system in a computer having a non-volatile memory (NVM) cache connected to a network having a remote storage volume, the steps comprising:
receiving data from one of an application and the computer operating system;
determining if the data is to be stored in either of the NVM cache or the remote storage volume;
transactionally writing the data to the remote storage volume if the data is to be stored in the remote storage volume;
caching the data to be stored in the remote storage volume in the NVM cache if one of a network outage is occurring and a transaction complete message has not been received;
transactionally writing the data cached in the NVM cache to be stored in the remote storage volume to the remote storage volume when the network is running; and
determining the data, static configuration data and dynamic configuration data that is to be stored in the NVM cache prior to at least one of powering down the computer operating system and hibernating the computer operating system.

16. The computer-readable medium of claim 15 having further computer executable instructions for performing the step comprising writing the data to be stored in the NVM cache to the NVM cache.

17. The computer-readable medium of claim 15 having further computer executable instructions for performing the step comprising storing data that is required by a user to continue operation during a network outage in the NVM cache.

18. The computer-readable medium of claim 15 having further computer executable instructions for performing the step comprising maintaining a history of prior use by the user.

19. The computer-readable medium of claim 15 wherein the step of determining the data, static configuration data and the dynamic configuration data includes the step of determining the data, a set of static configuration data and a set of dynamic configuration data that allows a user to continue working if a network outage occurs.

20. The computer-readable medium of claim 19 having further computer executable instructions for performing the steps comprising booting from the NVM cache if the network is not available when the computer is turned on.

21. The computer-readable medium of claim 19 having further computer executable instructions for performing the steps comprising resuming operation from hibernation using the NVM cache if the network is not available.

22. The computer-readable medium of claim 15 having further computer executable instructions for performing the step comprising writing data sent from the application during power down to be sent to the remote storage volume in the NVM cache.

23. The computer-readable medium of claim 15 having further computer executable instructions for performing the step comprising retransmitting data to the remote storage volume if the transaction complete message has not been received.

24. The computer-readable medium of claim 15 having further computer executable instructions for performing the step of determining if the data, static configuration data and dynamic configuration data are consistent with data, static configuration data and dynamic configuration data stored on the disk drive.

25. The computer-readable medium of claim 24 having further computer executable instructions for performing the step comprising performing one of updating the data, static configuration data and dynamic configuration data stored in the NVM cache and replicating data, static configuration data and dynamic configuration data stored on the NVM cache in the remote storage volume if the data, static configuration data and dynamic configuration data stored in the NVM cache and data, static configuration data and dynamic configuration data stored in the remote storage volume are not consistent.

* * * * *

UNITED STATES PATENT AND TRADEMARK OFFICE
CERTIFICATE OF CORRECTION

PATENT NO. : 7,036,040 B2
APPLICATION NO. : 10/304367
DATED : April 25, 2006
INVENTOR(S) : Clark D. Nicholson et al.

It is certified that error appears in the above-identified patent and that said Letters Patent is hereby corrected as shown below:

In column 7, line 36, after "183" insert -- . --.

In column 14, line 33, in Claim 1, delete "NYM" and insert -- NVM --, therefor.

In column 14, line 63, in Claim 9, delete "step" and insert -- steps --, therefor.

In column 14, line 64, in Claim 9, delete "NYM" and insert -- NVM --, therefor.

In column 15, line 44-45, in Claim 15, after "medium having" delete "a tangible component and".

Signed and Sealed this

Thirtieth Day of March, 2010

David J. Kappos
*Director of the United States Patent and Trademark Office*